United States Patent
Lee et al.

(10) Patent No.: US 11,702,506 B2
(45) Date of Patent: Jul. 18, 2023

(54) POLYCARBONATE AND PREPARATION METHOD THEREOF

(71) Applicant: LG CHEM, LTD., Seoul (KR)

(72) Inventors: Ki Jae Lee, Daejeon (KR); Young In Yang, Daejeon (KR); Youngwook Son, Daejeon (KR); Mooho Hong, Daejeon (KR); Byoungkue Jeon, Daejeon (KR); Young Young Hwang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 177 days.

(21) Appl. No.: 17/260,162

(22) PCT Filed: Aug. 9, 2019

(86) PCT No.: PCT/KR2019/010132
§ 371 (c)(1),
(2) Date: Jan. 13, 2021

(87) PCT Pub. No.: WO2020/032721
PCT Pub. Date: Feb. 13, 2020

(65) Prior Publication Data
US 2021/0292476 A1 Sep. 23, 2021

(30) Foreign Application Priority Data

Aug. 10, 2018 (KR) .................. 10-2018-0093986
Aug. 8, 2019 (KR) .................. 10-2019-0096974

(51) Int. Cl.
*C08G 64/28* (2006.01)
*C08G 64/30* (2006.01)
*C08G 64/08* (2006.01)

(52) U.S. Cl.
CPC ......... *C08G 64/305* (2013.01); *C08G 64/081* (2013.01); *C08G 64/28* (2013.01)

(58) Field of Classification Search
USPC ................. 528/196, 198, 271, 272
See application file for complete search history.

(56) References Cited

U.S. PATENT DOCUMENTS

| | | | |
|---|---|---|---|
| 4,788,273 A | 11/1988 | Alberto | |
| 6,114,437 A | 9/2000 | Brown et al. | |
| 2012/0149923 A1 | 6/2012 | Swaminathan et al. | |
| 2015/0291735 A1 | 10/2015 | Lee et al. | |
| 2017/0298177 A1 | 10/2017 | Lee et al. | |
| 2017/0321014 A1 | 11/2017 | Lee et al. | |
| 2022/0251056 A1* | 8/2022 | Lee ............... | C08G 64/305 |

FOREIGN PATENT DOCUMENTS

| | | | |
|---|---|---|---|
| CN | 1225928 A | 8/1999 | |
| CN | 102796250 A | 11/2012 | |
| CN | 106574044 A | 4/2017 | |
| CN | 107474229 A | 12/2017 | |
| CN | 108358876 A | 8/2018 | |
| CN | 111196874 A | * | 5/2020 |
| JP | 2008-308578 A | 12/2008 | |
| JP | 5562567 B2 | 7/2014 | |
| KR | 10-1326916 B1 | 11/2013 | |
| KR | 10-2013-0143589 A | 12/2013 | |
| KR | 10-2015-0034894 A | 4/2015 | |
| KR | 10-1859160 B1 | 6/2018 | |
| WO | 2015093525 A1 | 6/2015 | |

OTHER PUBLICATIONS

CN111196874A Wang, Yubin et al. Machine Translation (Year: 2020).*

* cited by examiner

*Primary Examiner* — Terressa Boykin
(74) *Attorney, Agent, or Firm* — Dentons US LLP (57) ABSTRACT

The present disclosure relates to a polycarbonate and a preparation method thereof, which has a novel structure with an improvement in weather resistance and refractive index, while having excellent mechanical properties.

15 Claims, 5 Drawing Sheets

POLYCARBONATE AND PREPARATION METHOD THEREOF

CROSS-REFERENCE TO RELATED APPLICATION

This application is a National Phase entry pursuant to 35 U.S.C. § 371 of International Application No. PCT/KR2019/010132, filed on Aug. 9, 2019, and claims priority to and the benefits of Korean Patent Applications No. 10-2018-0093986, filed on Aug. 10, 2018 and No. 10-2019-0096974, filed on Aug. 8, 2019 with the Korean Intellectual Property Office, the disclosure of which are hereby incorporated herein by reference in their entirety for all purposes as if fully set forth herein.

TECHNICAL FIELD

The present disclosure relates to a polycarbonate and a preparation method thereof. More particularly, the present disclosure relates to the polycarbonate and the preparation method thereof, which has a novel structure with an improvement in weather resistance and refractive index, while having excellent mechanical properties.

BACKGROUND

A polycarbonate resin is a polymer material, which has been used in various fields such as exterior materials of electrical and electronic equipments, automobile parts, construction materials, optical components, etc., thanks to its physical properties such as excellent impact strength, dimensional stability, heat resistance, transparency and the like.

With a recent expansion of this polycarbonate resin into more application fields such as glass and lens, there is a demand for developing a polycarbonate with a novel structure, which has an improvement in weather resistance, refractive index and the like, while maintaining physical properties inherent in the polycarbonate resin.

Accordingly, attempts have been made in researches into introducing monomers with different structures into a main chain of polycarbonate by copolymerizing two or more aromatic diols with different structures, and thus obtaining desired physical properties. However, most of the technologies have their limits in that the production cost is high, and an increase in chemical resistance, impact strength or the like leads to a decrease in transparency, while a rise in transparency results in a decline in chemical resistance, impact strength or the like.

Therefore, there is still a need for research and development on the polycarbonate with a novel structure, which has great weather resistance and refractive index, while having excellent mechanical properties such as hardness, etc., at the same time.

BRIEF DESCRIPTION

The present disclosure is to provide a polycarbonate and a preparation method thereof, which has great weather resistance and refractive index, while having excellent mechanical properties.

The present disclosure provides a polycarbonate, including a repeating unit represented by Chemical Formula 1.

Also, the present disclosure provides a preparation method of the polycarbonate, including a step of polymerizing a composition containing a compound represented by Chemical Formula 3, and a carbonate precursor.

Moreover, the present disclosure provides a molded article manufactured by using the polycarbonate.

Hereinafter, the polycarbonate, the preparation method thereof, and the molded article will be described in more detail according to specific exemplary embodiments of the disclosure.

According to one exemplary embodiment of the disclosure, there is provided a polycarbonate, including a repeating unit represented by the following Chemical Formula 1:

[Chemical Formula 1]

in Chemical Formula 1,

X is $C_{6-60}$ arylene unsubstituted or substituted with $C_{1-10}$ alkyl,

Y is oxygen (O), or sulfur (S), and n is an integer of 1 to 10.

The polycarbonate takes on a novel structure including a functional group having various arylene groups linked around a 5-membered heterocyclic group, and can further exhibit great weather resistance, refractive index characteristics and the like, while having excellent impact resistance, transparency, heat resistance, etc., which are characteristics inherent in existing polycarbonates.

More particularly, the repeating unit of the Chemical Formula 1, which forms the polycarbonate of the present disclosure, includes a structure of having an ester group and the 5-membered heterocyclic group linked to each other, can exhibit a more excellent effect of weather resistance and refractive index than existing polycarbonates due to a structural change caused by a fries-rearrangement reaction of the ester group, and can further increase an effect of improving weather resistance and refractive index of the polycarbonate depending on a content (n) of the repeating unit included in the structure of the Chemical Formula 1 as well as various structures of substituents X and Y.

The polycarbonate of the present disclosure can be formed only with the repeating unit represented by the Chemical Formula 1. Alternatively, such polycarbonate can further include a repeating unit derived from other aromatic diol compounds in addition to the repeating unit represented by the Chemical Formula 1.

According to one exemplary embodiment, the polycarbonate of the present disclosure can include the repeating unit represented by the Chemical Formula 1 and a repeating unit repeated by the following Chemical Formula 2:

[Chemical Formula 2]

in Chemical Formula 2, $R_1$ to $R_4$ are each independently hydrogen, $C_{1-10}$ alkyl, $C_{1-10}$ alkoxy, or halogen, and Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

In the present specification, the arylene having 6 to 60 carbon atoms can be a monocyclic arylene group or a polycyclic arylene group. Particularly, the arylene having 6 to 60 carbon atoms can be monocyclic or polycyclic arylene having 6 to 30 carbon atoms; or monocyclic or polycyclic arylene having 6 to 20 carbon atoms. More particularly, the arylene having 6 to 60 carbon atoms can be a divalent group derived from aromatic hydrocarbon such as benzene, biphenyl, diphenyl methane, diphenyl propane, terphenyl or the like, as monocyclic arylene, and can be a divalent group derived from aromatic hydrocarbon such as naphthalene, anthracene, phenanthrene, triphenylene, pyrene, perylene, chrysene, fluorene or the like, as polycyclic aryl, but is not limited thereto. Also, the arylene having 6 to 60 carbon atoms can be unsubstituted or substituted with an alkyl group having 1 to 10 carbon atoms.

In the present specification, fluorene can be substituted, or can form a spiro structure in such a way that two substituents bind to each other. When the fluorene is substituted, the fluorene can be

, etc., but is not limited thereto.

In the present specification, the alkyl group can be a linear or branched alkyl group having 1 to 10 carbon atoms, or 1 to 5 carbon atoms. As a specific example of the alkyl group, there are methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl, etc., but not limited thereto.

According to one embodiment of the present disclosure, in the Chemical Formula 1, the Y is oxygen (O) or sulfur (S).

Also, in the Chemical Formula 1, the X can be

Moreover, in the Chemical Formula 1, the n is an integer of 1 to 10, 1 to 8, or 1 to 4.

Furthermore, in the Chemical Formula 2, the $R_1$ to $R_4$ are each independently hydrogen, or $C_{1-4}$ alkyl. Preferably, the $R_1$ to $R_4$ can be each independently hydrogen, methyl, chloro, or bromo.

Also, in the Chemical Formula 2, Z is each independently linear or branched $C_{1-10}$ alkylene unsubstituted or substituted with phenyl, and more preferably can be methylene, ethane-1,1-diyl, propane-2,2-diyl, butane-2,2-diyl, 1-phenylethane-1,1-diyl, or diphenylmethylene.

The repeating unit represented by the Chemical Formula 1 is characterized by excellent refractive index, fluidity and weather resistance, while the repeating unit represented by the Chemical Formula 2 is characterized by excellent transparency and impact resistance. Accordingly, a weight ratio of the repeating units represented by the Chemical Formulae 1 and 2 can be adjusted to prepare a polycarbonate with desired physical properties.

When the polycarbonate of the present disclosure further includes the repeating unit represented by Chemical Formula 2 in addition to the repeating unit represented by the Chemical Formula 1, a weight ratio thereof is not particularly limited. For example, the weight ratio of the repeating unit represented by the Chemical Formula 1 and the repeating unit represented by the Chemical Formula 2 can be 99:1 to 1:99.

For example, for a high refractive index, such polycarbonate can include the repeating unit represented by the Chemical Formula 1 by more than 50 wt %, 60 wt % or more, or 70 wt % or more, and 99 wt % or less, preferably by more than 50 wt % and 99 wt % or less, and more preferably by 70 to 99 wt % based on a total weight of the repeating units. Meanwhile, for the high refractive index, the polycarbonate of the present disclosure can be formed only with the repeating unit represented by the Chemical Formula 1, that is, 100 wt % of the repeating unit represented by the Chemical Formula 1 based on a total weight of the repeating units.

On the other hand, for an effect of improving weather resistance, such polycarbonate can include the repeating unit represented by the Chemical Formula 1 by 5 wt % or more, or 10 wt % or more, and 50 wt % or less, preferably 5 to 30 wt %, and more preferably 10 to 30 wt % based on a total weight of the repeating units.

Also, if the Y is sulfur in the Chemical Formula 1, this case can show characteristics more favorable to the high refractive index. If the Y is oxygen therein, this case can exhibit characteristics more favorable to weather resistance.

Moreover, various characteristics can be exhibited even depending on a structure of the X in the Chemical Formula 1. If the X is a fluorene-based one, high refractive index characteristics can be better implemented.

As shown above, there can be provided a novel polycarbonate having desired physical properties suitably for its purposes, by appropriately adjusting types of substituents X and Y and contents thereof in the entire polycarbonate.

A weight average molecular weight (Mw) of the polycarbonate can be adjusted appropriately for its purposes and uses, and the weight average molecular weight can be 28,000 g/mol or more, 37,000 g/mol or more, or 38,000 g/mol or more, and 60,000 g/mol or less, 55,000 g/mol or less, or 52,000 g/mol or less, when measured by a gel permeation chromatograph (GPC) and calibrated using standard polystyrene (PS Standard).

Also, a melt index of the polycarbonate, which is measured in accordance with ASTM D1238 (300° C., 1.2 kg condition), can be adjusted appropriately for its purposes and uses, and can be 3 g/10 min or more, 5 g/10 min or more, or 7 g/10 min or more, and 30 g/10 min or less, 20 g/10 min or less, or 15 g/10 min or less.

Moreover, a refractive index (nD) of the polycarbonate of the present disclosure, which is measured in accordance with JIS-K-7142, can be 1.58 or more, preferably 1.58 to 1.68, or 1.59 to 1.67, and more preferably 1.60 to 1.67.

Furthermore, a weather resistance index (ΔE) of the polycarbonate of the present disclosure, which is calculated by measuring L, a, and b values of a specimen in accordance with ASTM D7869 and measuring L', a' and b' values again after leaving the specimen in 2250 hr weathering condition with Weather-Ometer® machine, can be 31 or less, and preferably 30 or less, 29 or less, 25 or less, 20 or less, 15 or less, 13 or less, or 11 or less. The lower weather resistance can be evaluated as the better. Thus, a lower limit thereof is not particularly limited, but can be, for example, 1 or more, 3 or more, 5 or more, 7 or more, or 8 or more.

Meanwhile, according to another exemplary embodiment of the present disclosure, there can be provided a preparation method of the polycarbonate, including a step of polymerizing a composition containing a compound represented by the following Chemical Formula 3, and a carbonate precursor:

[Chemical Formula 3]

in Chemical Formula 3,

X is $C_{6-60}$ arylene unsubstituted or substituted with $C_{1-10}$ alkyl,

Y is oxygen (O), or sulfur (S), and n is an integer of 1 to 10.

According to one embodiment of the present disclosure, in the Chemical Formula 3, the n can be an integer of 1 or more, 2 or more, or 3 or more, and 10 or less, 8 or less, 6 or less, or 4 or less.

Also, in the composition, the compound of the Chemical Formula 3 can be contained in a form of mixtures thereof within the range that the n is 1 to 10, respectively.

According to one embodiment of the present disclosure, a weight average molecular weight of the compound of the Chemical Formula 3 can be adjusted appropriately for its purposes and uses, and the weight average molecular weight can be 300 g/mol or more, 500 g/mol or more, or 700 g/mol or more, and 5,000 g/mol or less, 3,500 g/mol or less, or 2,000 g/mol or less, when measured by a gel permeation chromatograph (GPC) and calibrated using standard polystyrene (PS Standard).

According to one embodiment of the present disclosure, in the Chemical Formula 3, the Y is oxygen (O) or sulfur (S).

Also, in the Chemical Formula 3, the X can be

Moreover, in Chemical Formula 3, the n is an integer of 1 to 10, 1 to 8, or 1 to 4. The compound represented by the Chemical Formula 3 can be used alone or in a mixed form of one or more.

As a specific example of the compound represented by the Chemical Formula 3, there can be compounds of the following structural formulae, but the present disclosure is not limited thereto:

in the above structural formulae, n is as defined in the Chemical Formula 3.

The compound represented by the Chemical Formula 3 can be synthesized by an esterification reaction according to the following Reaction Formula 1, and can be referred to more specific details in the after-mentioned embodiments:

[Reaction Formula 1]

in the above Reaction Formula 1, X, Y and n are as defined in the Chemical Formula 3.

According to one embodiment of the present disclosure, such compound can be polymerized by further containing an aromatic diol compound represented by the following Chemical Formula 4:

[Chemical Formula 4]

in Chemical Formula 4, $R_1$ to $R_4$ are each independently hydrogen, $C_{1-10}$ alkyl, $C_{1-10}$ alkoxy, or halogen, and Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

As a specific example of the aromatic diol compound represented by the Chemical Formula 4, there can be included at least one compound selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, 2,2-bis(4-hydroxyphenyl)propane (bisphenol A), 2,2-bis(4-hydroxyphenyl)butane, 1,1-bis(4-hydroxyphenyl)cyclohexane (bisphenol Z), 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2- bis(4-hydroxy-3,5-dimethylphenyl)propane, and 1,1-bis(4-hydroxyphenyl)-1-phenylethane.

Also, the carbonate precursor serves to link the compound represented by the Chemical Formula 3 and the compound represented by the Chemical Formula 4 to each other. As a specific example thereof, there can be phosgene, triphosgene, diphosgene, bromophosgene, dimethyl carbonate, diethyl carbonate, dibutyl carbonate, dicyclohexyl carbonate, diphenyl carbonate, ditolyl carbonate, bis(chlorophenyl) carbonate, m-cresyl carbonate, dinaphthylcarbonate, bis(diphenyl) carbonate or bishaloformate.

If the composition contains only the compound represented by the Chemical Formula 3 and the carbonate precursor as a monomer, the compound represented by the Chemical Formula 3 can be used by 70 wt % or more, 79 wt % or more, or 80 wt % or more, and 95 wt % or less, 90 wt % or less, or 89% or less based on 100 wt % of the composition.

Also, the carbonate precursor can be used by 10 wt % or more, 19 wt % or more, or 20 wt % or more, and 35 wt % or less, 30 wt % or less, or 29% or less based on 100 wt % of the composition.

Meanwhile, during the polymerization, if the composition contains the compound represented by the Chemical Formula 3, the aromatic diol compound represented by the Chemical Formula 4, and the carbonate precursor as a monomer, the compound represented by the Chemical Formula 3 can be used by 10 wt % or more, 20 wt % or more, or 30 wt % or more, and 70 wt % or less, 50 wt % or less, or 40% or less based on 100 wt % of the composition.

Also, the aromatic diol compound represented by the Chemical Formula 4 can be used by 10 wt % or more, 20 wt % or more, or 30 wt % or more, and 70 wt % or less, 50 wt % or less, or 40% or less based on 100 wt % of the composition.

Moreover, the carbonate precursor can be used by 10 wt % or more, 19 wt % or more, or 20 wt % or more, and 35 wt % or less, 30 wt % or less, or 29% or less based on 100 wt % of the composition.

At this time, it is preferable that the polymerization is performed as an interfacial polymerization. During the interfacial polymerization, a polymerization reaction is possible and a molecular weight is easily adjusted at atmospheric pressure and low temperatures.

It is preferable that the polymerization temperature is 0° C. to 40° C. and a reaction time is 10 minutes to 5 hours. Also, it is preferable that a pH is maintained at 9 or more, or 11 or more during the reaction.

Any solvent can be used in the polymerization without particular limitation, as long as such solvent is used in the polymerization of the polycarbonate in the art. As an example, halogenated hydrocarbons such as methylene chloride, chlorobenzene, etc., can be used.

Also, it is preferable that the polymerization is performed in the presence of an acid binder. As the acid binder, the followings can be used: alkali metal hydroxides such as sodium hydroxide, potassium hydroxide, etc., or amine compounds such as pyridine, etc.

Moreover, it is preferable that polymerization is performed in the presence of a molecular weight modifier, in order to control a molecular weight of the polycarbonate during the polymerization. As the molecular weight modifier, 01-20 alkylphenol can be used. As a specific example thereof, there can be p-tert-butylphenol, p-cumylphenol, decylphenol, dodecylphenol, tetradecylphenol, hexadecylphenol, octadecylphenol, eicosylphenol, docosylphenol or triacontylphenol. The molecular weight modifier can be added thereinto before, during and after initiation of the polymerization. The molecular weight modifier can be used in an amount of 0.01 to 10 parts by weight, preferably 0.1 to 6 parts by weight per 100 parts by weight of the aromatic diol compound, and a desired molecular weight can be obtained within that range.

Also, reaction accelerators such as tertiary amine compounds, quaternary ammonium compounds, quaternary phosphonium compounds, etc., for example, triethylamine, tetra-n-butylammonium bromide, tetra-n-butylphosphonium bromide, etc., can be further used in order to speed up the polymerization reactions.

According to another exemplary embodiment of the present disclosure, there can be provided a molded article manufactured by using the polycarbonate. As described above, the polycarbonate including the repeating unit represented by the Chemical Formula 1 has also an improvement in weather resistance, while having excellent mechanical properties, and thus has wider application fields compared to molded articles manufactured by using existing polycarbonates. The weight ratio of repeating units represented by the Chemical Formulae 1 and 2 can be adjusted, thereby preparing the polycarbonate with desired physical properties.

In addition to the polycarbonate according to the present disclosure, the molded article can contain at least one selected from the group consisting of antioxidants, plasticizers, antistatic agents, nucleating agents, flame retardants, lubricants, impact modifiers, fluorescence brightening agents, ultraviolet ray absorbents, pigments and dyes, if necessary.

As one example of a preparation method of the molded article, there can be included a step of well mixing the inventive polycarbonate and other additives with a mixer, then performing extrusion molding with an extruding machine to manufacture pellets, then drying the pellets, and then performing injection with an injection molding machine.

According to the present disclosure, there can be provided a polycarbonate and a preparation method thereof, which has a novel structure with an improvement in weather resistance and refractive index, while having excellent mechanical properties.

DETAILED DESCRIPTION OF THE EMBODIMENTS

The present disclosure will be described in more detail through the following embodiments. However, the following embodiments are provided only for the purpose of illustrating the present disclosure, and thus the present disclosure is not limited thereto.

EXAMPLES: PREPARATION OF POLYCARBONATE

Example 1

(1) Preparation of BP-TPDCA (bis(4-(2-(4-hydroxyphenyl)propan-2-yl)phenyl)thiophene-2,5-dicarboxylate)

15 g of thiophene-2,5-dicarboxylic acid was dissolved in 100 ml of methylene chloride solvent in a round flask, after which 24.3 g of oxalyl chloride and 0.29 g of DMF were added dropwise thereto at room temperature, and stirred at room temperature for about 4 hours. When a resulting reactant became transparent and did not cause any foams, the reactant was slowly added to 41.7 g of bisphenol A, 27.6 g of pyridine and 200 ml of methylene chloride solvent without a separate purification process, and stirred at room temperature for 24 hours. 50 ml of 35% HCl was added thereto to finish the reaction, and then washed with water and dichloromethane. A final compound, i.e., bis(4-(2-(4-hydroxyphenyl)propan-2-yl)phenyl)thiophene-2,5-dicarboxylate (weight average molecular weight: 1,300 g/mol) was obtained with a final yield of 92%. At this time, the compound was obtained in a form of mixtures thereof, wherein n is 1 to 4, respectively.

Figure 1:
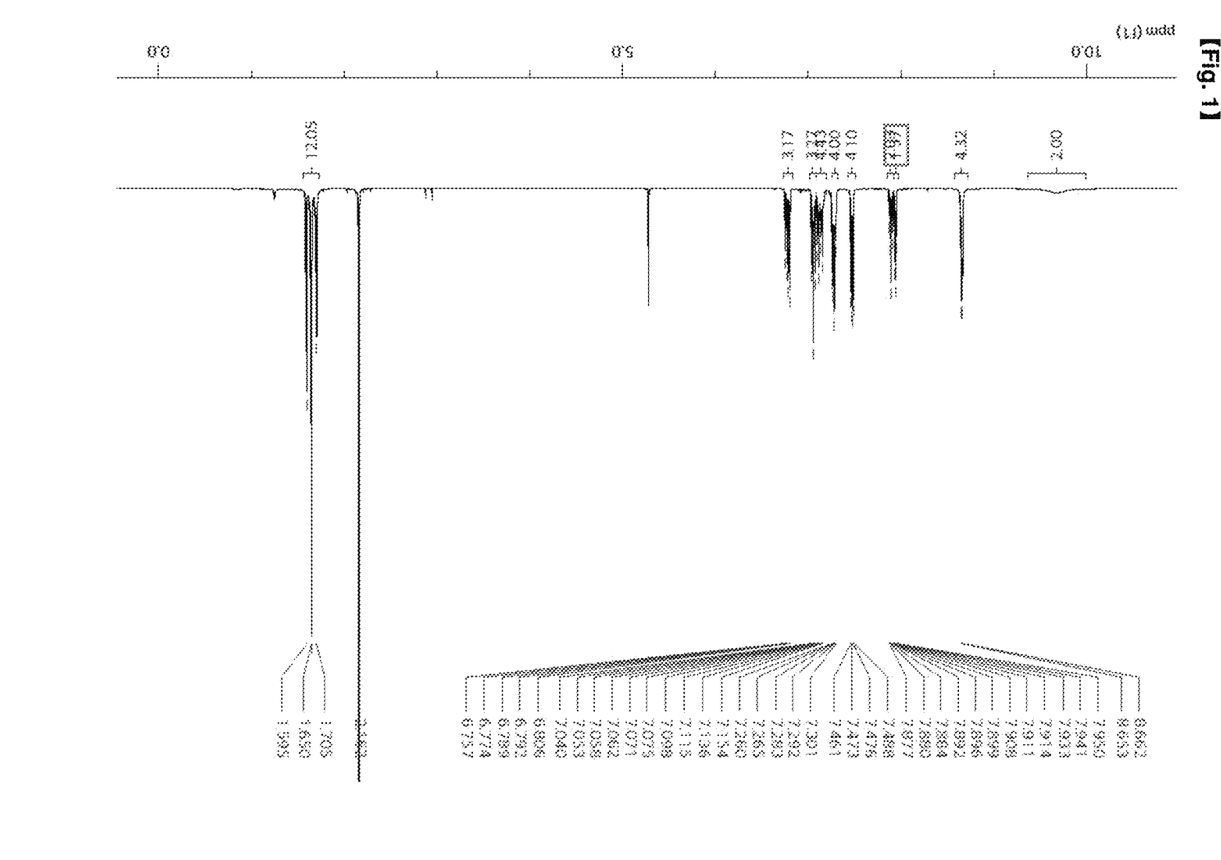
FIG. 1 is a $^1$H-NMR graph of the compound prepared in Example 1.

$^1$H-NMR (CDCl$_3$-d$_1$) of the compound is shown in FIG. 1.

(2) Preparation of Polycarbonate Resin

247 g of water, 138.8 g of bis(4-(2-(4-hydroxyphenyl)propan-2-yl)phenyl)thiophene-2,5-dicarboxylate prepared in (1) above, 41 g of 40 wt % NaOH, and 165 ml of MeCl$_2$ were put into a 2 L main reactor which is equipped with a nitrogen purge and a condenser and might be kept at room temperature with a circulator, and then stirred for minutes.

After stopping nitrogen purging, 23 g of triphosgene and 60 g of MeCl$_2$ were put into a 1 L round-bottom flask to dissolve triphosgene therein, after which a resulting dissolved triphosgene solution was slowly put into the main reactor, in which BP-TPDCA solution had been dissolved. After such input was completed, 1 g of PTBP (p-tert-butylphenol) was put thereinto and stirred for about 10 minutes. Such agitation was completed, after which 39.8 g of 40 wt % NaOH aqueous solution was put thereinto, such that 0.42 g of TEA was put thereinto as a coupling agent. At this time, a reaction pH was maintained at 11-13. A resulting mixture was left alone for a while to fully carry out a reaction, after which HCl was put thereinto to finish the reaction, such that the pH was dropped to 3-4. Then, agitation was stopped, after which a polymer layer and a water layer were separated from each other, such that a rinsing process was performed repeatedly three to five times by removing the water layer therefrom and putting pure H$_2$O thereinto again.

When rinsing was completely done, only the polymer layer was extracted therefrom, after which a polymer crystal was obtained via reprecipitation by using non-solvents such as methanol, H$_2$O, etc. At this time, a weight average molecular weight of the polycarbonate prepared was 50,000 g/mol based on PS standard.

Example 2

(1) Preparation of BP-FDCA (bis(4-(2-(4-hydroxyphenyl)propan-2-yl)phenyl)furan-2,5-dicarboxylate)

Synthesis was performed in the same manner as in Example 1, except that 15 g of 2,5-furandicarboxylic acid was used instead of thiophene-2,5-dicarboxylic acid of Example 1, and 26.8 g of oxalyl chloride, 0.33 g of DMF, 46.1 g of bisphenol A, and 30.4 g of pyridine were used.

A final compound, i.e., bis(4-(2-(4-hydroxyphenyl)propan-2-yl)phenyl)furan-2,5-dicarboxylate (weight average molecular weight: 1,250 g/mol) was obtained with a final yield of 87%. At this time, the compound was obtained in a form of mixtures thereof, wherein n is 1 to 4, respectively.

Figure 2:
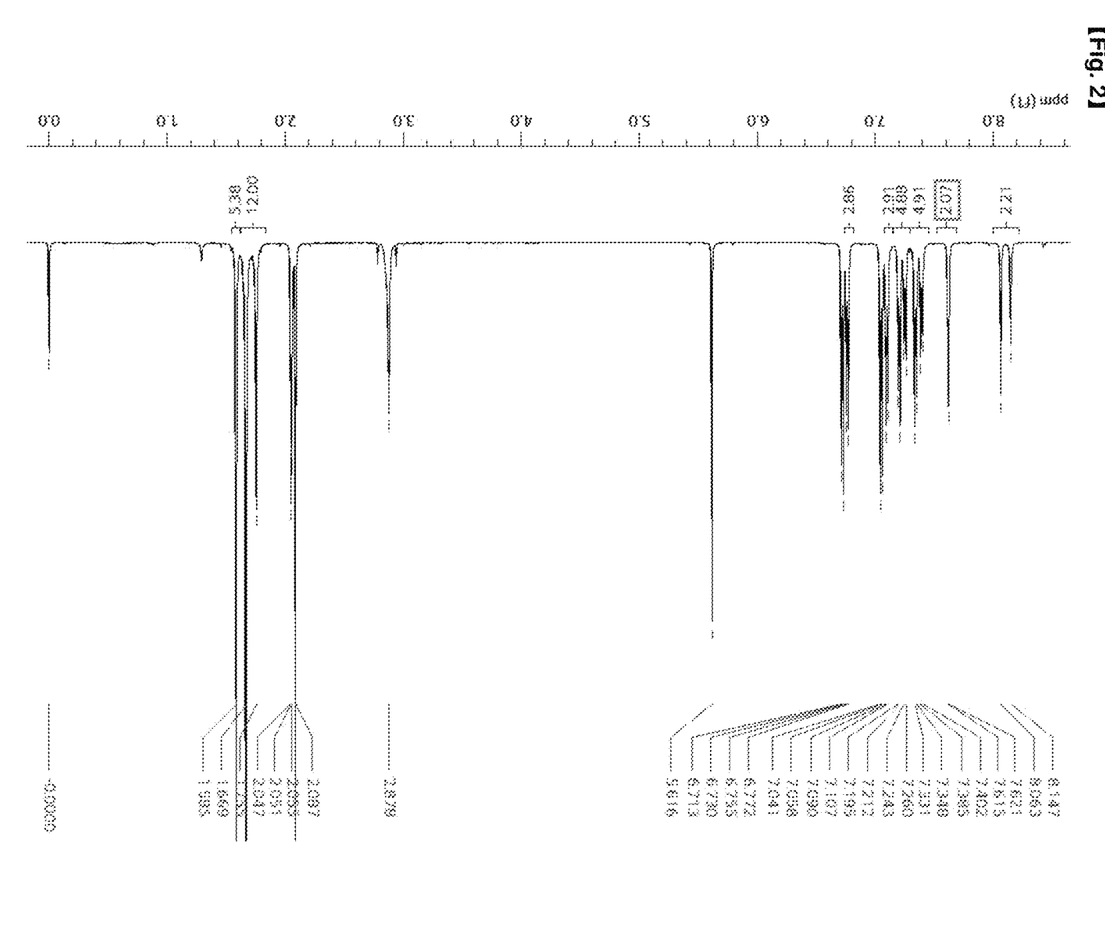
FIG. 2 is a $^1$H-NMR graph of the compound prepared in Example 2.

$^1$H-NMR (acetone-$d_6$) of the compound is shown in FIG. 2.

(2) Preparation of Polycarbonate Resin

A polycarbonate was prepared in the same manner as the preparation method of the polycarbonate resin of Example 1, except that 126.7 g of bis(4-(2-(4-hydroxyphenyl)propan-2-yl)phenyl)furan-2,5-dicarboxylate prepared in (1) above was used instead of bis(4-(2-(4-hydroxyphenyl)propan-2-yl)phenyl)thiophene-2,5-dicarboxylate of Example 1. At this time, a weight average molecular weight of the polycarbonate prepared was 50,000 g/mol based on PS standard.

Example 3

(1) Preparation of BHP-TPDCA (bis(3-hydroxyphenyl)thiophene-2,5-dicarboxylate)

Synthesis was performed in the same manner as in Example 1, except that 15 g of thiophene-2,5-dicarboxylic acid of Example 1 was used, and 20.1 g of resorcinol and 41.4 g of pyridine were used instead of 24.3 g of oxalyl chloride, 0.29 g of DMF, and bisphenol A.

A final compound, i.e., bis(3-hydroxyphenyl)thiophene-2,5-dicarboxylate (weight average molecular weight: 850 g/mol) was obtained with a final yield of 97%. At this time, the compound was obtained in a form of mixtures thereof, wherein n is 1 to 4, respectively.

Figure 3:
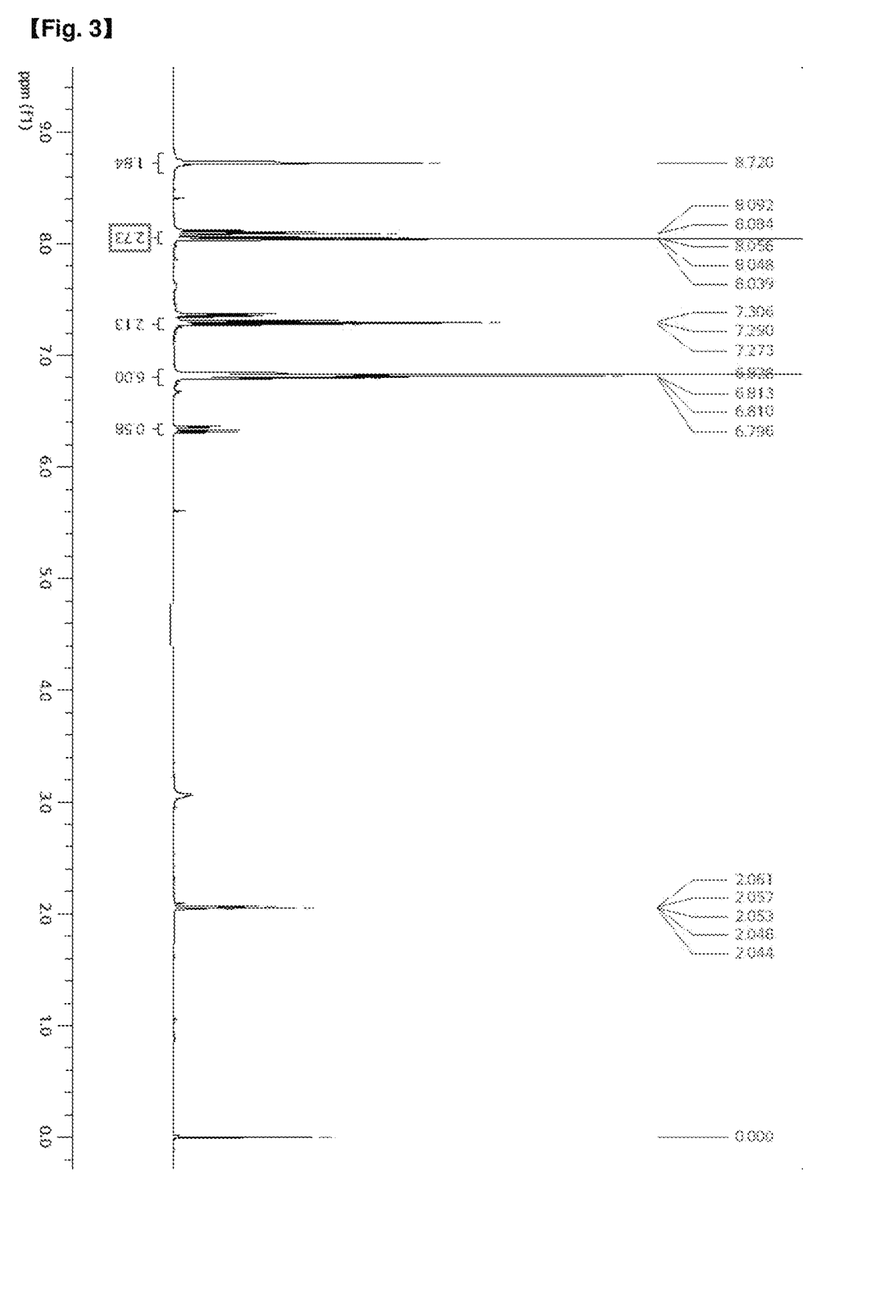
FIG. 3 is a $^1$H-NMR graph of the compound prepared in Example 3.

$^1$H-NMR (acetone-$d_6$) of the compound is shown in FIG. 3.

(2) Preparation of Polycarbonate Resin

A polycarbonate was prepared in the same manner as the preparation method of the polycarbonate resin of Example 1, except that 75.4 g of bis(3-hydroxyphenyl)thiophene-2,5-dicarboxylate prepared in (1) above was used instead of bis(4-(2-(4-hydroxyphenyl)propan-2-yl)phenyl)thiophene-2,5-dicarboxylate of Example 1. At this time, a weight average molecular weight of the polycarbonate prepared was 49,000 g/mol based on PS standard.

Example 4

(1) Preparation of BPF-TPDCA (bis(4-(9-(4-hydroxyphenyl)-9H-fluoren-9-yl)phenyl)thiophene-2,5-dicarboxylate)

Synthesis was performed in the same manner as in Example 1, except that 15 g of thiophene-2,5-dicarboxylic acid of Example 1 was used, and 62.6 g of 4,4'-(9H-fluorene-9,9-diyl)diphenol and 41.4 g of pyridine were used instead of 24.3 g of oxalyl chloride, 0.29 g of DMF, and bisphenol A.

A final compound, i.e., bis(4-(9-(4-hydroxyphenyl)-9H-fluoren-9-yl)phenyl)thiophene-2,5-dicarboxylate (weight average molecular weight: 1,800 g/mol) was obtained with a final yield of 81%. At this time, the compound was obtained in a form of mixtures thereof, wherein n is 1 to 4, respectively.

Figure 4:
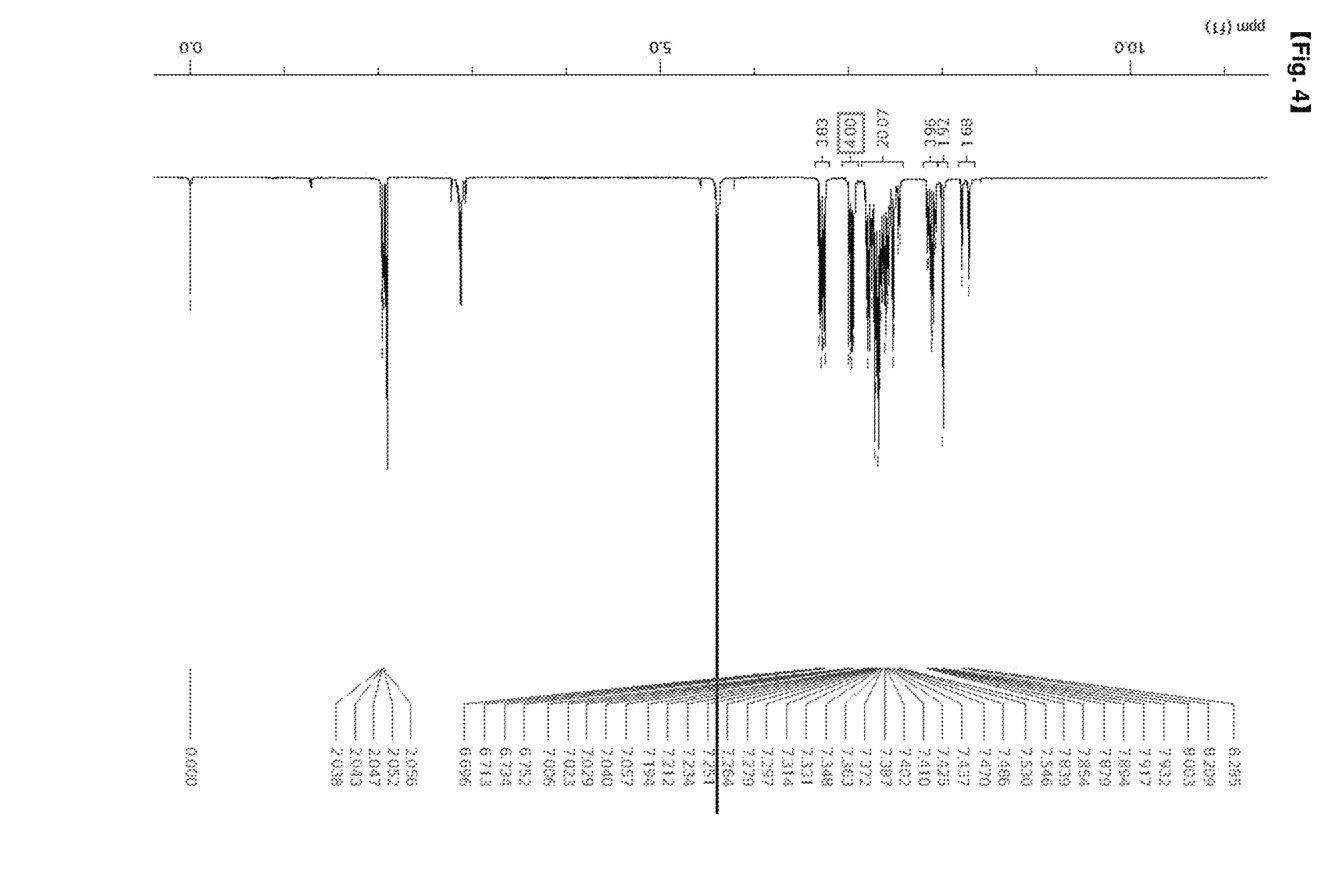
FIG. 4 is a $^1$H-NMR graph of the compound prepared in Example 4.

$^1$H-NMR (acetone-$d_6$) of the compound is shown in FIG. 4.

(2) Preparation of Polycarbonate Resin

A polycarbonate was prepared in the same manner as the preparation method of the polycarbonate resin of Example 1, except that 195.9 g of bis(4-(9-(4-hydroxyphenyl)-9H-fluoren-9-yl)phenyl)thiophene-2,5-dicarboxylate prepared in (1) above was used instead of bis(4-(2-(4-hydroxyphenyl)propan-2-yl)phenyl)thiophene-2,5-dicarboxylate of Example 1. At this time, a weight average molecular weight of the polycarbonate prepared was 50,000 g/mol based on PS standard.

Example 5

(1) Preparation of BPF-FDCA (bis(4-(9-(4-hydroxyphenyl)-9H-fluoren-9-yl)phenyl)furan-2,5-dicarboxylate)

Synthesis was performed in the same manner as in Example 1, except that 15 g of 2,5-furandicarboxylic acid was used instead of thiophene-2,5-dicarboxylic acid of Example 1, and 69 g of 4,4'-(9H-fluorene-9,9-diyl)diphenol and 45.6 g of pyridine were used instead of 24.3 g of oxalyl chloride, 0.29 g of DMF, and bisphenol A.

A final compound, i.e., bis(4-(9-(4-hydroxyphenyl)-9H-fluoren-9-yl)phenyl)furan-2,5-dicarboxylate (weight average molecular weight: 1,760 g/mol) was obtained with a final yield of 91%. At this time, the compound was obtained in a form of mixtures thereof, wherein n is 1 to 4, respectively.

Figure 5:
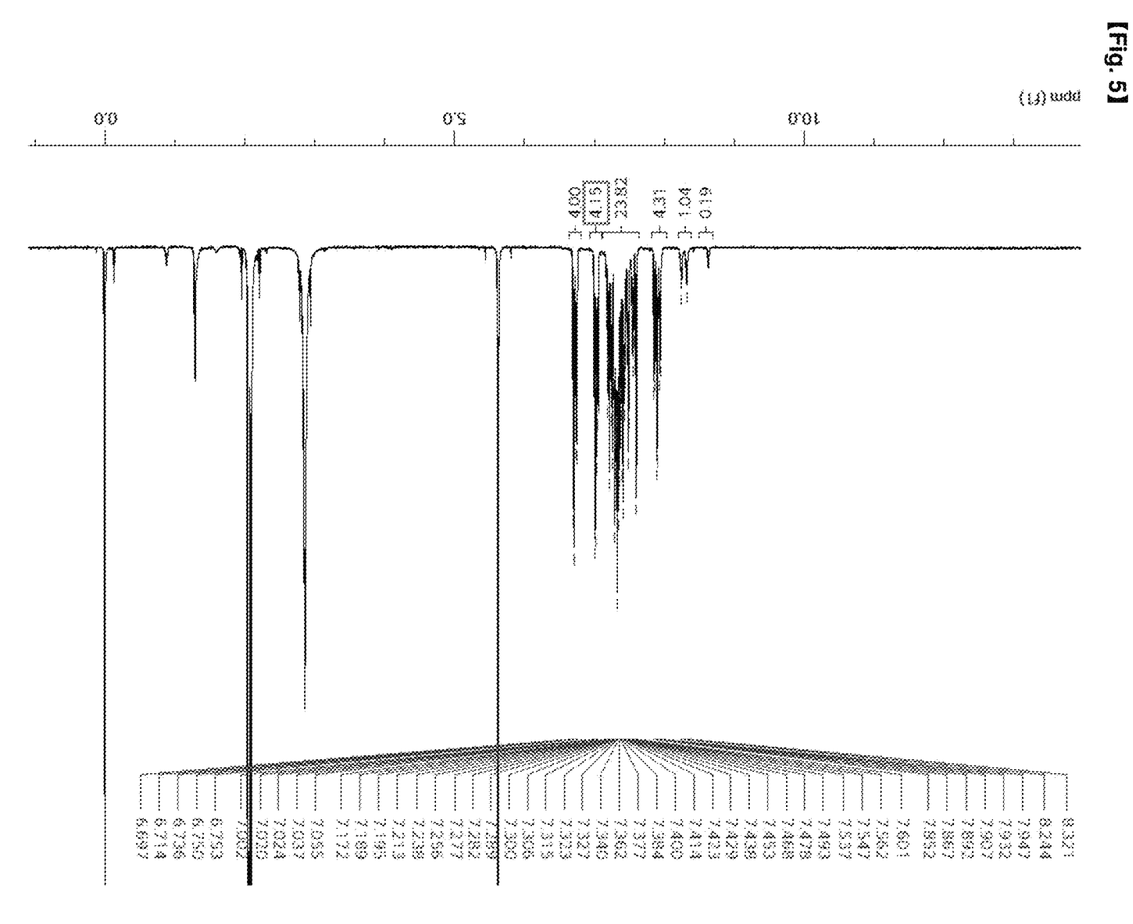
FIG. 5 is a $^1$H-NMR graph of the compound prepared in Example 5.

$^1$H-NMR (acetone-$d_6$) of the compound is shown in FIG. 5.

(2) Preparation of Polycarbonate Resin

A polycarbonate was prepared in the same manner as the preparation method of the polycarbonate resin of Example 1, except that 183.2 g of bis(4-(9-(4-hydroxyphenyl)-9H-fluoren-9-yl)phenyl)furan-2,5-dicarboxylate prepared in (1) above was used instead of bis(4-(2-(4-hydroxyphenyl)propan-2-yl)phenyl)thiophene-2,5-dicarboxylate of Example 1. At this time, a weight average molecular weight of the polycarbonate prepared was 49,000 g/mol based on PS standard.

Example 6

619 g of water, 15.4 g of bis(4-(2-(4-hydroxyphenyl)propan-2-yl)phenyl)thiophene-2,5-dicarboxylate (BP-TPDCA) prepared in (1) of Example 1 above, 111.3 g of bisphenol A, 102.5 g of 40 wt % NaOH, and 195 ml of MeCl$_2$ were put into a 2 L main reactor which is equipped with a nitrogen purge and a condenser and might be kept at room temperature with a circulator, and then stirred for minutes.

After stopping nitrogen purging, 62.81 g of triphosgene and 120 ml of MeCl$_2$ were put into a 1 L round-bottom flask to dissolve triphosgene therein, after which a resulting dissolved triphosgene solution was slowly put into the main reactor, in which a mixed solution of BP-TPDCA and BPA had been dissolved. After such input was completed, 2.5 g of PTBP (p-tert-butylphenol) was put thereinto and stirred for about 10 minutes. Such agitation was completed, after which 99.4 g of 40 wt % NaOH aqueous solution was put thereinto, such that 1.04 g of TEA was put thereinto as a coupling agent. At this time, a reaction pH was maintained at 11-13. A resulting mixture was left alone for a while to fully carry out a reaction, after which HCl was put thereinto to finish the reaction, such that the pH was dropped to 3-4. Then, agitation was stopped, after which a polymer layer and a water layer were separated from each other, such that a rinsing process was repeatedly performed three to five times by removing the water layer therefrom and putting pure H$_2$O thereinto again.

When rinsing was completely done, only the polymer layer was extracted therefrom, after which a polymer crystal was obtained via reprecipitation by using non-solvents such as methanol, H$_2$O, etc. At this time, a weight average molecular weight of the polycarbonate prepared was 49,000 g/mol based on PS standard. As a result of NMR analysis, it was identified that the repeating unit derived from BP-TPDCA is included by 10 wt % based on a total weight of the repeating units.

Example 7

Polymerization was performed in the same manner as in Example 6, except that 15.84 g of bis(4-(2-(4-hydroxyphenyl)propan-2-yl)phenyl)furan-2,5-dicarboxylate (BP-FDCA) prepared in (1) of Example 2 was used instead of bis(4-(2-(4-hydroxyphenyl)propan-2-yl)phenyl)thiophene-2,5-dicarboxylate in Example 6, and 110.65 g of bisphenol A was used. At this time, a weight average molecular weight of the polycarbonate prepared was 49,000 g/mol based on PS standard. Also, as a result of NMR analysis, it was identified that the repeating unit derived from BP-FDCA is included by 10 wt % based on a total weight of the repeating units.

Example 8

Polymerization was performed in the same manner as in Example 6, except that 15.4 g of (bis(3-hydroxyphenyl) thiophene-2,5-dicarboxylate (BHP-TPDCA) prepared in (1) of Example 3 was used instead of bis(4-(2-(4-hydroxyphenyl)propan-2-yl)phenyl)thiophene-2,5-dicarboxylate in Example 6, and 111.3 g of bisphenol A was used. At this time, a weight average molecular weight of the polycarbonate prepared was 49,000 g/mol based on PS standard. As a result of NMR analysis, it was identified that the repeating unit derived from BHP-TPDCA is included by 10 wt % based on a total weight of the repeating units.

Example 9

Polymerization was performed in the same manner as in Example 6, except that 15.4 g of bis(4-(9-(4-hydroxyphenyl)-9H-fluoren-9-yl)phenyl)thiophene-2,5-dicarboxylate (BPF-TPDCA) prepared in (1) of Example 4 was used instead of bis(4-(2-(4-hydroxyphenyl)propan-2-yl)phenyl) thiophene-2,5-dicarboxylate in Example 6, and 111.3 g of bisphenol A was used. At this time, a weight average molecular weight of the polycarbonate prepared was 49,000 g/mol based on PS standard. As a result of NMR analysis, it was identified that the repeating unit derived from BPF-TPDCA is included by 10 wt % based on a total weight of the repeating units.

Example 10

Polymerization was performed in the same manner as in Example 6, except that 15.4 g of bis(4-(9-(4-hydroxyphenyl)-9H-fluoren-9-yl)phenyl)furan-2,5-dicarboxylate (BPF-FDCA) prepared in (1) of Example 5 was used instead of bis(4-(2-(4-hydroxyphenyl)propan-2-yl)phenyl)thiophene-2,5-dicarboxylate in Example 6, and 111.3 g of bisphenol A was used. At this time, a weight average molecular weight of the polycarbonate prepared was 49,000 g/mol based on PS standard. As a result of NMR analysis, it was identified that the repeating unit derived from BPF-FDCA is included by 10 wt % based on a total weight of the repeating units.

Example 11

Polymerization was performed in the same manner as in Example 6, except that 38.5 g of bis(4-(9-(4-hydroxyphenyl)-9H-fluoren-9-yl)phenyl)thiophene-2,5-dicarboxylate) prepared in (1) of Example 4 was used instead of bis(4-(2-(4-hydroxyphenyl)propan-2-yl)phenyl)thiophene-2,5-dicarboxylate in Example 6, and 107.2 g of bisphenol A was used. At this time, a weight average molecular weight of the polycarbonate prepared was 49,000 g/mol based on PS standard. As a result of NMR analysis, it was identified that the repeating unit derived from BP-TPDCA is included by 30 wt % based on a total weight of the repeating units.

Example 12

Polymerization was performed in the same manner as in Example 6, except that 62.5 g of bis(4-(9-(4-hydroxyphenyl)-9H-fluoren-9-yl)phenyl)thiophene-2,5-dicarboxylate) synthesized in (1) of Example 4 was used instead of bis(4-(2-(4-hydroxyphenyl)propan-2-yl)phenyl)thiophene-2,5-dicarboxylate in Example 6, and 101.3 g of bisphenol A was used. At this time, a weight average molecular weight of the polycarbonate prepared was 49,000 g/mol based on PS standard. As a result of NMR analysis, it was identified that the repeating unit derived from BP-TPDCA is included by 50 wt % based on a total weight of the repeating units.

Example 13

Polymerization was performed in the same manner as in Example 6, except that 79.29 g of bis(4-(9-(4-hydroxyphenyl)-9H-fluoren-9-yl)phenyl)thiophene-2,5-dicarboxylate) synthesized in (1) of Example 4 was used instead of bis(4-(2-(4-hydroxyphenyl)propan-2-yl)phenyl)thiophene-2,5-dicarboxylate in Example 6, and 97.26 g of bisphenol A was used. At this time, a weight average molecular weight of the polycarbonate prepared was 50,000 g/mol based on PS standard. As a result of NMR analysis, it was identified that the repeating unit derived from BP-TPDCA is included by 70 wt % based on a total weight of the repeating units.

Comparative Example 1

619 g of water, 116.5 g of bisphenol A, 102.5 g of 40 wt % NaOH, and 195 ml of $MeCl_2$ were put into a 2 L main reactor which is equipped with a nitrogen purge and a condenser and might be kept at room temperature with a circulator, and then stirred for minutes.

After stopping nitrogen purging, 62.81 g of triphosgene and 120 ml of $MeCl_2$ were put into a 1 L round-bottom flask to dissolve triphosgene therein, after which a resulting dissolved triphosgene solution was slowly put into the main reactor, in which BPA had been dissolved. After such input was completed, 2.5 g of PTBP (p-tert-butylphenol) was put thereinto and stirred for about 10 minutes. Such agitation was completed, after which 99.4 g of 40 wt % NaOH aqueous solution was put thereinto, such that 1.04 g of TEA was put thereinto as a coupling agent. At this time, a reaction pH was maintained at 11-13. A resulting mixture was left alone for a while to fully carry out a reaction, after which HCl was put thereinto to finish the reaction, such that the pH was dropped to 3-4. Then, agitation was stopped, after which a polymer layer and a water layer were separated from each other, such that a rinsing process was repeatedly performed three to five times by removing the water layer therefrom and putting pure $H_2O$ thereinto again.

When rinsing was completely done, only the polymer layer was extracted therefrom, after which a polymer crystal was obtained via reprecipitation by using non-solvents such as methanol, $H_2O$, etc. At this time, a weight average molecular weight of the polycarbonate prepared was 49,000 g/mol based on PS standard.

Experimental Examples: Evaluation of Physical Properties of Polycarbonate

The characteristics of injection-molded specimens of polycarbonates prepared in Examples and Comparative Example above were measured by means of the following method, and the results thereof are shown in Table 1.

Weight average molecular weight (Mw): 200 mg of polymer resin was diluted in 200 ml of tetrahydrofuran (THF) solvent to manufacture a sample of about 1000 ppm. Then, a molecular weight thereof was measured with an RI detector at 1 ml/min flow by using Agilent 1200 series GPC equipment. With regard to criteria for calculating a molecular weight of the sample, a calibration curve was drawn up by measuring eight PS standards, after which the molecular weight of the sample was calculated accordingly.

Flowability (MI): Measured in accordance with ASTM D1238 (300° C., 1.2 kg condition).

Refractive index (nD): Measured for a specimen with a thickness of ⅛ inch in accordance with JIS-K-7142 by using an abbe refractometer. (23° C., wavelength of 589 nm)

Weather resistance index (ΔE): Measured for a specimen with a thickness of ⅛ inch by measuring L, a, and b values of the specimen in accordance with ASTM D7869 and measuring L', a' and b' values again after leaving the specimen in 2250 hr weathering condition with Weather-Ometer® machine. From the results, the weather resistance index (ΔE) was calculated according to the following Formula 1.

$$\Delta E = \sqrt{((L'-L)^2+(a'-a)^2+(b'-b)^2)} \qquad [\text{Equation 1}]$$

TABLE 1

| | Type and weight ratio of repeating unit of Chemical Formula 1 | Mw (g/mol) | Ml (g/10 min) | Refractive index (nD) | Weather resistance index (ΔE) |
|---|---|---|---|---|---|
| Example 1 | BP-TPDCA, 100 wt % | 50,000 | 8 | 1.63 | 29 |
| Example 2 | BP-FDCA, 100 wt % | 50,000 | 8 | 1.61 | 25 |
| Example 3 | BHP-TPDCA, 100 wt % | 49,000 | 11 | 1.62 | 22 |
| Example 4 | BPF-TPDCA, 100 wt % | 50,000 | 7 | 1.68 | 27 |
| Example 5 | BPF-FDCA, 100 wt % | 49,000 | 7 | 1.67 | 22 |
| Example 6 | BP-TPDCA, 10 wt % | 49,000 | 11 | 1.58 | 9 |
| Example 7 | BP-FDCA, 10 wt % | 49,000 | 11 | 1.58 | 8 |
| Example 8 | BHP-TPDCA, 10 wt % | 49,000 | 13 | 1.59 | 9 |
| Example 9 | BPF-TPDCA, 10 wt % | 49,000 | 9 | 1.59 | 8 |
| Example 10 | BPF-FDCA, 10 wt % | 49,000 | 9 | 1.59 | 7 |
| Example 11 | BP-TPDCA, 30 wt % | 49,000 | 10 | 1.61 | 11 |
| Example 12 | BP-TPDCA, 50 wt % | 49,000 | 9 | 1.63 | 15 |
| Example 13 | BP-TPDCA, 70 wt % | 50,000 | 8 | 1.65 | 27 |
| Comparative Example 1 | 0 wt % | 49,000 | 15 | 1.58 | 32 |

With reference to the above Table 1, the polycarbonate prepared by using a monomer including a thiophene structure out of the monomers of the Chemical Formula 3 generally showed high refractive characteristics than the polycarbonate prepared by using a monomer including a furan structure, and the polycarbonate prepared by using the monomer including the furan structure was more excellent in terms of weather resistance.

Meanwhile, in case of all the Examples including the repeating unit of the present disclosure, weather resistance was more excellent than the general BPA polycarbonate of Comparative Example 1. In particular, an effect of improving weather resistance was highest when the repeating unit of Chemical Formula 1 was included by 50 wt % or less, and more preferably by about 10 wt %.

When considering the results as above, in case of preparing a polycarbonate for the purpose of a high refractive index such as lens, it is preferable to include a high content of the monomer of the Chemical Formula 3 having the thiophene structure. In case of preparing a polycarbonate requiring weather resistance, it is advantageous to include a low content of the monomer of the Chemical Formula 3 having the furan structure. Thus, it appears that the polycarbonate with desired physical properties can be prepared by adjusting the content and the monomer thereof suitably for its purposes.

What is claimed is:

1. A polycarbonate, comprising a repeating unit represented by Chemical Formula 1:

[Chemical Formula 1]

wherein, in Chemical Formula 1,
X is $C_{6-60}$ arylene unsubstituted or substituted with $C_{1-10}$ alkyl,
Y is oxygen (O), or sulfur (S), and
n is an integer of 1 to 10.

2. The polycarbonate of claim 1,
wherein X is one of structures represented by the following structural formulae:

3. The polycarbonate of claim 1,
further comprising a repeating unit represented by Chemical Formula 2:

[Chemical Formula 2]

wherein, in Chemical Formula 2,
$R_1$ to $R_4$ are each independently hydrogen, $C_{1-10}$ alkyl, $C_{1-10}$ alkoxy, or halogen, and
Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

4. The polycarbonate of claim 3,
wherein $R_1$ to $R_4$ are each independently hydrogen, or $C_{1-4}$ alkyl.

5. The polycarbonate of claim 3,
wherein the repeating unit represented by Chemical Formula 1 is included in an amount of 5 to 50 wt % based on a total weight of the repeating units.

6. The polycarbonate of claim 3,
wherein the repeating unit represented by Chemical Formula 1 is included in an amount of more than 50 wt % and 99 wt % or less based on a total weight of the repeating units.

7. The polycarbonate of claim 1,
wherein a refractive index (nD) of the polycarbonate measured in accordance with JIS-K-7142 is 1.58 to 1.68.

8. The polycarbonate of claim 1,
wherein a weather resistance index (ΔE) of the polycarbonate is 31 or less, calculated according to Equation 1 by measuring L, a, and b values of a specimen in accordance with ASTM D7869 and measuring L', a' and b' values again after leaving the specimen in 2250 hr weathering condition:

$$\Delta E = \sqrt{((L'-L)^2 + (a'-a)^2 + (b'-b)^2)}.$$  [Equation 1]

9. The polycarbonate of claim 1,
wherein a melt index of the polycarbonate measured in accordance with ASTM D1238 (300° C., 1.2 kg condition) is 3 g/10 min to 30 g/10 min.

10. A method of preparing the polycarbonate of claim 1, comprising a step of polymerizing a composition containing a compound represented by Chemical Formula 3, and a carbonate precursor:

[Chemical Formula 3]

wherein, in Chemical Formula 3,
X is $C_{6-60}$ arylene unsubstituted or substituted with $C_{1-10}$ alkyl,
Y is oxygen (O), or sulfur (S), and
n is an integer of 1 to 10.

11. The method of claim 10,
wherein X in Chemical Formula 3 is one of structures represented by the following structural formulae:

, and

12. The method of claim 10,
wherein the compound represented by Chemical Formula 3 is one of compounds represented by the following structural formulae:

-continued wherein, in the above structural formulae, n is as defined in Chemical Formula 3.

13. The method of claim 10, wherein the composition further contains an aromatic diol compound represented by Chemical Formula 4:

[Chemical Formula 4]

wherein, in Chemical Formula 4,
$R_1$ to $R_4$ are each independently hydrogen, $C_{1-10}$ alkyl, $C_{1-10}$ alkoxy, or halogen, and
Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

14. The method of claim 13,
wherein the aromatic diol compound represented by the Chemical Formula 4 is at least one compound selected from the group consisting of bis(4-hydroxyphenyl) methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, 2,2-bis(4-hydroxyphenyl)propane (bisphenol A), 2,2-bis(4-hydroxyphenyl)butane, 1,1-bis(4-hydroxyphenyl)cyclohexane (bisphenol Z), 2,2-bis(4-hydroxy-3,5-dibromophenyl) propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, and 1,1-bis(4-hydroxyphenyl)-1-phenylethane.

15. A molded article comprising the polycarbonate of claim 1.

* * * * *